United States Patent [19]

Hickey

[11] Patent Number: 4,832,228
[45] Date of Patent: May 23, 1989

[54] POULTRY TRAY LINER

[76] Inventor: David J. Hickey, 1311 Wakefield Pl., Greensboro, N.C. 27410

[21] Appl. No.: 94,323

[22] Filed: Sep. 8, 1987

[51] Int. Cl.⁴ .............................................. A01K 31/00
[52] U.S. Cl. ................... 220/408; 229/6 A; 119/19
[58] Field of Search ............... 220/408, 410; 229/6 A; 119/19; 428/134, 136, 138

[56] References Cited

U.S. PATENT DOCUMENTS

| | | | |
|---|---|---|---|
| 2,026,417 | 12/1935 | Conway et al. | 229/6 A |
| 2,134,051 | 10/1938 | Kirby | 229/6 A |
| 2,503,874 | 4/1950 | Ives | 428/134 |
| 3,326,186 | 6/1967 | Doll | 119/19 |
| 3,641,983 | 2/1972 | Keen et al. | 119/19 X |
| 3,642,967 | 2/1972 | Doll | 428/134 X |
| 3,760,769 | 9/1973 | Erfeling | 119/19 X |
| 3,919,445 | 11/1975 | Smarook | 428/134 X |
| 4,259,385 | 3/1981 | Keller | 428/138 X |

Primary Examiner—Steven M. Pollard

[57] ABSTRACT

A disposable laminated tray liner for use by poultry breeders and growers is formed by affixing an expanded paper layer to a planar paper base. The layers are adhered by a waterproof adhesive or the like and the irregular top surface of the expanded paper layer provides traction for turkey poults or chicks while assisting in keeping the birds clean and healthy.

6 Claims, 3 Drawing Sheets

POULTRY TRAY LINER

BACKGROUND OF THE INVENTION

1. Field Of The Invention

The invention herein relates to an improved disposable tray liner for turkey poults or other animals which are contained in trays or cages, said liner comprising one or more layers of an expanded material such as paper which has been permanently affixed to a base sheet. The expanded material provides traction for the standing poults.

2. Description Of The Prior Art

Modern poultry hatcheries and farms utilize trays which are a convenient size for handling and use in, for example, incubators which may require trays sized approximately twenty-six (26) by twenty-eight (28) inches in length and width having walls of approximately four (4) inches in height. Disposable liners are placed on the inside bottoms of such trays to assist in maintenance and cleaning after use since the liners can be easily removed and incinerated. The liners maintain the eggs from rolling, therefore reducing breakage and as hatching occurs, the liners provide traction for the young birds. This is especially advantageous to turkey poults which are awkward and unsteady to a greater degree than young chickens since the poults are processed to include inoculation, debeaking and detoeing prior to being placed in trays for transportation to poultry farms where they are removed and raised to maturity. It is important that young birds and especially turkey poults maintain their footing during shipment so they arrive at the farms in excellent health. Blood and waste products are deposited in the trays during transportation which can cause a slick and unsanitary surface for the feet of the poults. Oftentimes poults that lose their footing and fall are trampled and pecked by other poults and oftentimes have to be destroyed.

Various types of tray liners have been employed in the past including liners made from paper, sponge rubber, excelsior and other materials, all having certain advantages and also which have certain disadvantages. For example, excelsior has often been used but it is more flammable than desired and due to its independent structural components it can be difficult to handle and contain. While removing used excelsior from trays, shards therefrom often stick to the tray bottoms and must be individually loosened and removed requiring additional time and labor. Synthetic foam materials have been affixed to paper underlayers and utilized to a limited degree but have not been satisfactory from a cost standpoint and for other reasons including excessive moisture retention.

Thus, with the known disadvantages of prior art tray liners, the present invention was developed and one of its objectives is to provide a lightweight, disposable tray liner for poultry which will assist the young birds in maintaining their footing as they are transported from hatcheries to farms.

It is also an objective of the invention to provide a tray liner which will trap down from freshly hatched birds in the incubators to prevent the down from becoming airborne upon drying.

It is another objective of the present invention to provide a tray liner which is formed from an inexpensive material such as paper that is easily discarded and which will provide structural qualities necessary for safe and sanitary containment of the poults.

It is yet another objective of the present invention to provide a method for forming a tray liner which is relatively simple and inexpensive to manufacture.

Still another objective of the invention is to provide a high traction tray liner which is formed from two (2) layers of oppositely oriented expanded paper affixed to a flat base sheet.

Various other advantages and features of the invention will become apparent to those skilled in the art as the detailed explanation of the invention is presented below.

SUMMARY OF THE INVENTION

The aforesaid objectives and advantages are realized by forming a disposable tray liner from a plurality of expanded material layers which are affixed to a planar base. The paper used may be of a waste or reprocessed type or other special papers can be used as desired. The liner can be formed by adhering one or more layers of an expanded material laminate to a thin paper base by using a quick-setting, water resistant or hot-melt adhesive. Once the adhesive sets the laminate can be cut into convenient sizes where it is packaged and shipped for use. Two expanded layers and the flat base sheet may form a height of three-eighths ($\frac{3}{8}$) inch and the openings of the expanded layers allow waste to pass below the top surface to the top of the base which keeps the upper surface of the liner free of waste and allows good foot traction for the young birds.

DESCRIPTION OF THE PREFERRED EMBODIMENTS

The preferred form of the liner comprises a three-tier laminate having a flat planar base formed from reprocessed paper having a weight of approximately one hundred fifty (150) pounds per thousand (1000) square feet and having two (2) expanded paper layers having a weight each of approximately twenty-six (26) pounds per thousand (1000) square feet prior to expansion. The first expanded layer is adhesively affixed to the planar base and on top of the first expanded layer is affixed in opposite orientation a second expanded paper layer. The openings of the expanded layers are shaped in somewhat of an irregular oval and have an opening width less than the opening length, said opening length being approximately one-half ($\frac{1}{2}$) inch. The liner thickness consisting of two (2) expanded layers and a planar base is approximately three-eighths ($\frac{3}{8}$) inch. A waterproof adhesive is used to join the layers and the method of production includes adhering the layers by gluing and then cutting the laminate into convenient sizes for packing and shipping.

DETAILED DESCRIPTION OF THE DRAWINGS AND OPERATION OF THE INVENTION

Figure 1:
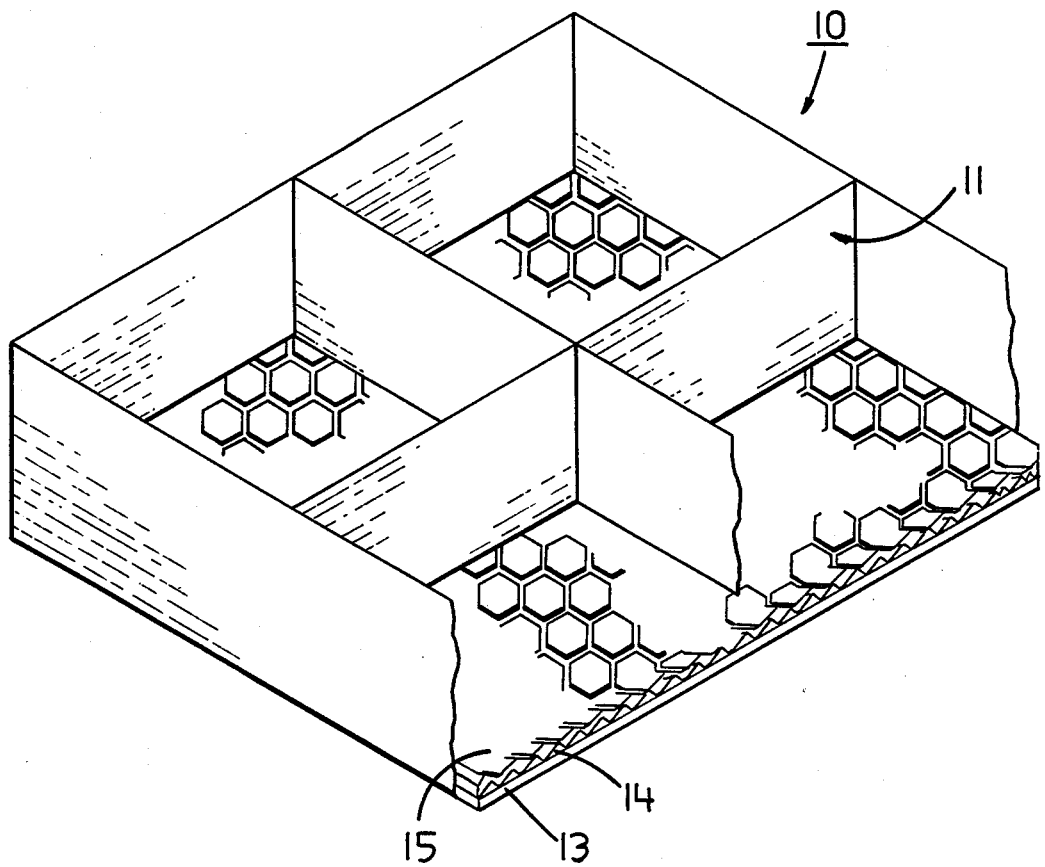
FIG. 1 demonstrates a typical four-section poultry tray in partial cut-away fashion demonstrating and exposing the liner placed therein.

Turning now to the drawings, FIG. 1 shows a typical four compartment poultry tray 10 having a removable divider 11. Tray 10 and divider 11 may be made from plastics or other suitable materials which are lightweight, durable and sized to accommodate approximately twenty-five (25) poults per section. On the inside bottom of tray 10 is placed a laminated liner 12 consisting of planar base sheet 13 with a first expanded layer 14 and a second expanded layer 15, all of which are permanently bonded together by a waterproof or other suitable adhesive. Liner 12 is formed from paper made of a desired weight and quality and such paper may include waste or reprocessed papers or may include special coated papers. In order to prevent the spread of infection and disease, the paper can be treated with an antiseptic solution such as Neomyicin or mold inhibitors to discourage the spread of disease or sickness. Other coated papers which are waterproof or water-strength papers may be used for additional rigidity and structural integrity of the liner. As shown herein, liners 12 are utilized especially for poultry type purposes although such liners may be used for other animal cages as desired. The adhesive as used herein to adhere the laminate structure may include acrylics, melamines or other waterproof resin-based adhesives which set by solvent evaporation or cross linking or they may include hot-melt adhesives which become rigid as they cool from a high to ambient temperature.

As would be further understood, the particular paper strength and thickness of a particular laminate 12 would depend on the specific bird or animal contained within the tray or cage and the rigidity of the liner can be modified by the amount and type of adhesive and the type of coating application in combination with the particular paper characteristics selected.

Figure 2:
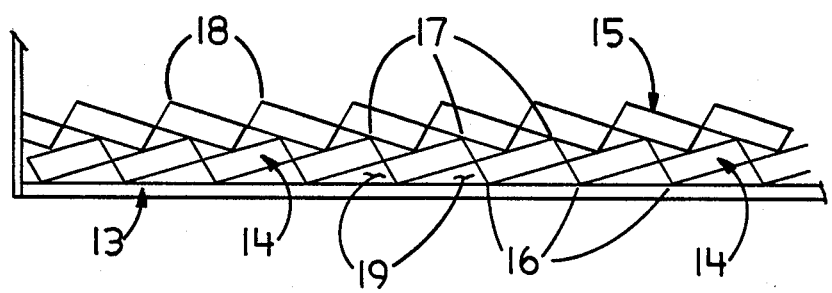
FIG. 2 shows an enlarged end view of the liner as seen in FIG. 1.
Figure 3:
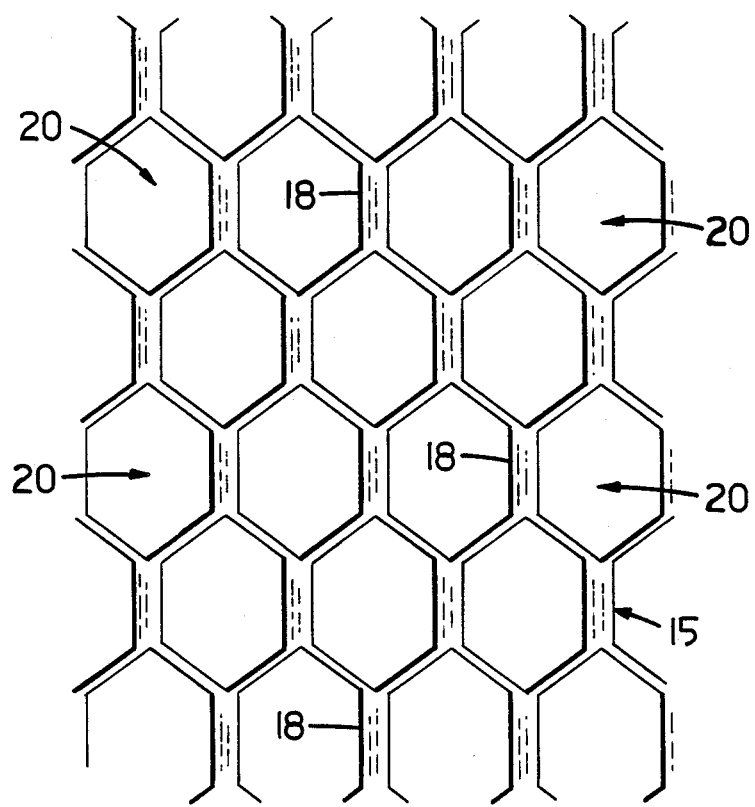
FIG. 3 is an enlarged top view of one expanded tier of the liner having a right-to-left orientation.
Figure 4:
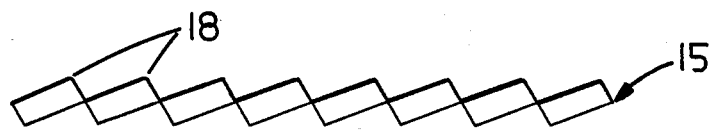
FIG. 4 demonstrates an end view of the tier as seen in FIG. 3.

In FIG. 2, a three-tier laminate 12 is shown having a thin flat base 13 which is adhered along 16 to first expanded layer 14 by an appropriate waterproof adhesive. As shown in FIG. 2, first expanded layer 14 has a right-to-left orientation and second expanded layer 15 has an opposite orientation, that is, left-to-right, and is adhered at lines 17 to first expanded layer 14. As further illustrated in FIG. 2, the second or top expanded layer 15 includes a series of ridge-like projections 18 having a distance therebetween of approximately one-half ($\frac{1}{2}$) inch. This configuration provides for good traction for the young birds and as would be understood, liquid and solid waste 19 for the most part passes through expanded layers 14 and 15 and is deposited on planar base 13 as also shown in FIG. 2. As better seen in FIG. 3, expanded layer oval-like openings 20 allow for fluids and other waste to pass therethrough. The lower portion of expanded layer 14 as seen in FIG. 3 is shown in an end view of FIG. 4. and as would be understood, expanded layer 14 has a right-to-left descent or orientation. The oval-like openings 20 are also useful in trapping moist down from birds as they hatch in incubators. Down carries salmonella and other bacteria which can be transmitted when the down dries and becomes airborne. Thus, by being trapped when wet in opening 20, liner 12 improves the sanitary conditions of the environment.

Figure 6:
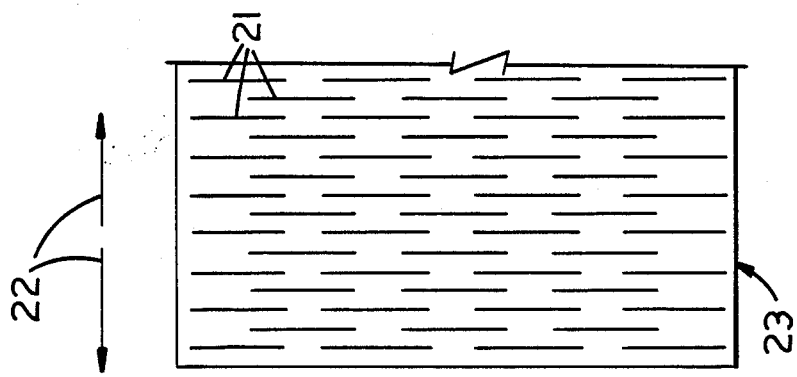
FIG. 6 shows a top view of the expanded paper as slit prior to expansion.

By providing laminate 12 with two (2) expanded layers having opposite orientation as seen in FIG. 2, a relatively thich and inexpensive laminate is provided which is both lightweight, durable and provides a sanitary surface for young birds. The total thickness of laminate 12 as shown in FIG. 2 may be, for example, three-eighths ($\frac{3}{8}$) inch although thicker or thinner laminates can be manufactured and employed for particular use requirements. As shown in FIG. 6, a portion of a flat paper sheet 23 has been slit along lines 21 which upon expansion form openings 20. Lateral stress has been indicated by arrows 22 and such lateral tension or force causes staggered slits 21 to open in sheet 23 resulting in the irregular top surface as shown in FIG. 1. Flat slitted sheet 23 as shown in FIG. 6 may be expanded to a width of approximately twice its normal size by applying lateral tension as shown by the arrows at 22.

Figure 5:
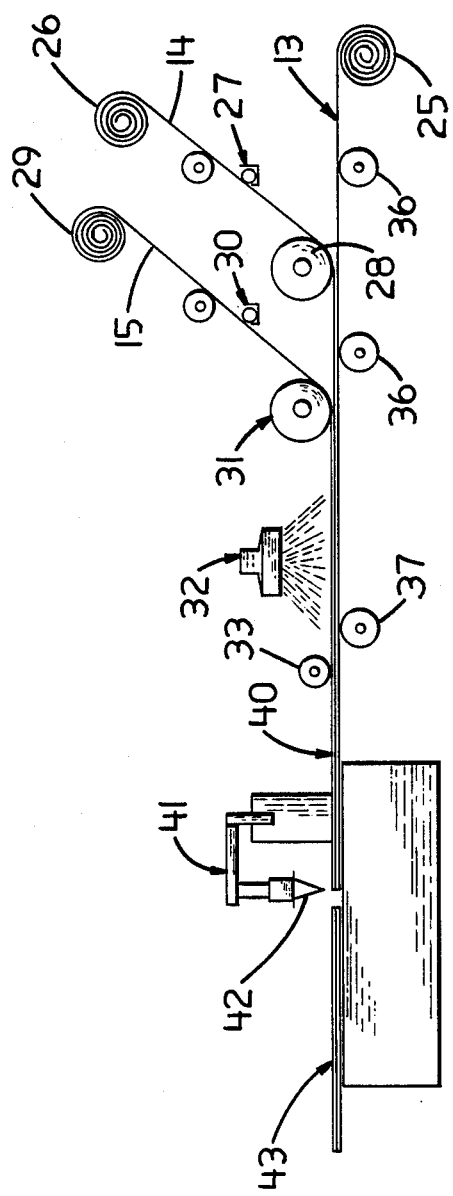
FIG. 5 shows a typical laminate processing operation for manufacturing the liner.

The step forming laminated liners 12 as shown in FIG. 2 is pictured in abbreviated fashion in Fig. 5. A roll 25 of flat base material 13 meets expanded paper layer 14 from roll 26 which has passed over adhesive roller 27 that applies a resin/glue to layer 14, where both are pressed into engagement by pressure roller 28 and proximate support roller 36. Spray or drip adhesive applications may also be employed if desired. Thereafter, as the laminate moves from right to left as shown in FIG. 5, a second expanded paper roll 29 provides top expanded layer 15 to laminate 40 after being coated with an adhesive by second adhesive roller 30. As further explained, first adhesive roller 27 and second adhesive roller 30 may apply a hot-melt or other adhesive depending on the end results desired. Pressure roller 31 then applies desired pressure to the three-tier laminate 40 and drying means 32 which may be a radiant heat source, hot air fan or other device under which laminate 40 passes. Next, laminate 40 moves over support roller 37 and under feed roller 33 which applies a very light pressure to laminate 40. Laminate 40 then travels to hydraulic knife 41 whereby blade 42 which may be activated manually or automatically cuts laminate 40 into desired sheets 43 which are packed and shipped to poultry growers and the like.

The method of assembling laminate 40 as shown in FIG. 5 is but a single schematic of a variety of ways by which laminate 40 can be manufactured. The method of manufacture and liner 12 can be modified by those skilled in the art and the examples and illustrations presented herein are merely for explanatory purposes and not intended to limit the scope of the appended claims.

I claim:

1. A container for live poultry or the like including a tray having a bottom and side walls, the improvement comprising: a tray liner, said liner formed from an expanded material, said expanded material consisting of a thin paper-like sheet which has been longitudinally slit and laterally stressed to form a plurality of biased oval-like openings therein, and a base sheet, said expanded material attached to said base sheet.

2. A container for live poultry or the like as claimed in claim 1 wherein said tray liner includes a plurality of layers of expanded material.

3. A container for live poultry or the like as claimed in claim 1 wherein said tray liner includes a pair of layers of expanded material, each of said layers oriented in a different direction and one of said layers affixed to a base sheet.

4. A tray liner comprising: a planar base, said planar base consisting of a flat paper sheet having a weight of less than one hundred fifty (150) pounds per one thousand (1000) square feet, a first expanded layer, said expanded layer consisting of a thin sheet which has been longitudinally slit and laterally stressed to form a plurality of oval-like openings therein, said first expanded layer formed from paper having a sheet weight of less than thirty (30) pounds per one thousand (1000) square feet prior to expansion, said first expanded layer being adhesively bonded to said planar base, a second expanded layer, said second expanded layer consisting of a thin sheet which has been longitudinally slit and laterally stressed to form a plurality of oval-like openings therein, said second expanded paper layer formed from paper having a sheet weight of less than thirty (30) pounds per one thousand (1000) square feet prior to expansion, and said second expanded layer adhesively bonded to said first expanded layer.

5. A tray liner as claimed in claim 4 wherein said first expanded layer has an orientation opposite to the orientation of said second expanded layer.

6. A tray liner comprising: a planar base, a first expanded layer, said expanded layer formed from a material which has been longitudinally slit and laterally stressed to form a series of biased oval-like openings therein, said first expanded layer attached to said base, a second expanded layer, said second expanded layer formed from a material which has been longitudinally slit and laterally stressed to form a series of biased oval-like openings therein, said second expanded layer attached to said first expanded layer, said first and said second expanded layers having opposite orientations.

* * * * *

REEXAMINATION CERTIFICATE (1706th)
United States Patent [19]
Hickey

[11] B1 4,832,228
[45] Certificate Issued  May 19, 1992

[54] POULTRY TRAY LINER

[76] Inventor: David J. Hickey, 1311 Wakefield Pl., Greensboro, N.C. 27410

Reexamination Request:
No. 90/002,276, Feb. 11, 1991

Reexamination Certificate for:
Patent No.: 4,832,228
Issued: May 23, 1989
Appl. No.: 94,323
Filed: Sep. 8, 1987

[51] Int. Cl.$^5$ .............................. A01K 31/00
[52] U.S. Cl. .................. 220/408; 229/120.1; 119/19
[58] Field of Search ............... 220/408, 676; 229/120.1; 119/19; 428/134, 138

[56] References Cited

U.S. PATENT DOCUMENTS

| Number | Date | Name | Class |
|---|---|---|---|
| Re. 29,524 | 1/1978 | Spencer | 428/134 |
| 1,610,285 | 12/1926 | Hodge | 229/6 A |
| 1,917,456 | 7/1933 | Mickelson | 428/134 |
| 2,026,417 | 12/1935 | Conway et al. | 119/19 |
| 2,134,051 | 10/1938 | Kirby | 229/31 |
| 2,345,844 | 4/1944 | Weiss | 117/98 |
| 2,853,411 | 9/1958 | Riley | 154/49 |
| 3,067,039 | 12/1962 | Crane | 428/134 |
| 3,326,186 | 6/1967 | Doll | 119/19 |
| 3,586,649 | 6/1971 | Cobbledick | 260/2.5 AZ |
| 3,641,983 | 2/1972 | Keen et al. | 119/17 |
| 3,642,967 | 2/1972 | Doll | 220/676 X |
| 3,687,797 | 8/1972 | Wideman | 161/129 |
| 3,760,769 | 9/1973 | Erfeling | 119/48 |
| 3,822,176 | 7/1974 | Harrison | 161/159 |
| 3,842,832 | 10/1974 | Wideman | 128/169 |
| 4,276,339 | 6/1981 | Stoveken | 428/153 |
| 4,832,228 | 5/1989 | Hickey | 220/408 |

*Primary Examiner*—Steven M. Pollard

[57] ABSTRACT

A disposable laminated tray liner for use by poultry breeders and growers is formed by affixing an expanded paper layer to a planar paper base. The layers are adhered by a waterproof adhesive or the like and the irregular top surface of the expanded paper layer provides traction for turkey poults or chicks while assisting in keeping the birds clean and healthy.

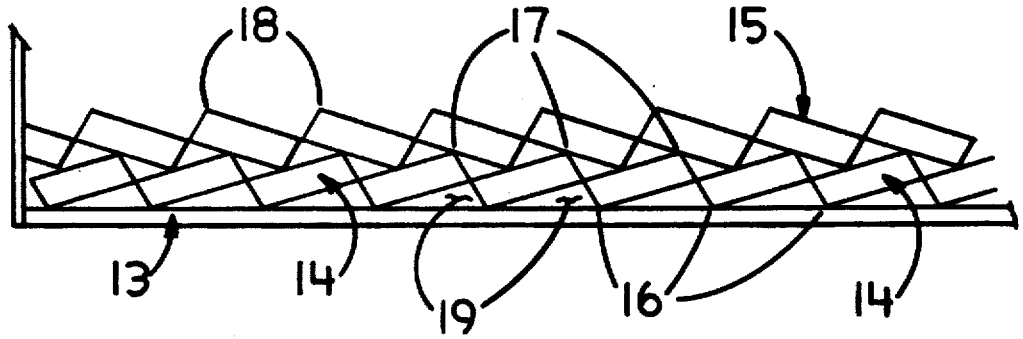

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–6 is confirmed.

Claim 1 is determined to be patentable as amended.

Claims 2 and 3, dependent on an amended claim, are determined to be patentable.

New claims 7–14 are added and determined to be patentable.

1. A container for live poultry or the like including a tray having a bottom and side walls, the improvement comprising: a tray liner, said liner formed from an expanded material, said expanded material consisting of a thin paper-like sheet which has been longitudinally slit and laterally stressed to form a plurality of biased oval-like openings therein, and a base sheet, said expanded material attached to said base sheet, *said base sheet for contacting said bottom of said tray.*

7. *A container for live poultry as claimed in claim 1 wherein said base sheet of said tray liner is paper-like.*

8. *A container for live poultry as claimed in claim 1 wherein said tray liner is rigid.*

9. *A container for live poultry as claimed in claim 1 wherein said tray liner is non-resilient.*

10. *A container for live poultry as claimed in claim 1 wherein said planar base sheet is attached to the bottom of said expanded material to receive waste thereon which passes through said biased oval-like openings.*

11. *A container and tray liner for live poultry or the like, including a tray having a bottom and side walls, said tray liner comprising: a first layer, said first layer comprising a planar paper-like base, a second layer comprising an expanded material consisting of a thin paper-like sheet which has been longitudinally slit and layerally stressed to form a series of biased oval-like openings therein, said expanded material comprising an irregular top and bottom surface, said top and bottom surface each comprising a plurality of projections along the sides of said oval-like openings, said planar base attached to said bottom surface projections of said expanded layer to form a two layer laminated liner.*

12. *The container and tray liner as claimed in claim 11 and including a third layer, said third layer comprising an expanded material consisting of a thin paper-like sheet which has been longitudinally slit and laterally stressed to form a series of biased oval-like openings therein, said third layer of expanded material comprising an irregular top and bottom surface, said top and bottom surface each comprising a plurality of projections therealong about the sides of said oval-like openings, said third layer oriented relative to said second layer with said bottom surface projections of said third layer affixed between said top surface projections of said second layer whereby said second layer openings are only partially aligned with said third layer openings but allowing access therethrough to said planar base whereby waste will pass through said third and second layer openings and be deposited on said planar base.*

13. *The container and tray liner as claimed in claim 12 wherein said openings are horizontally biased.*

14. *A tray liner comprising: a first layer comprising a paper-like planar base, a second layer comprising an expanded paper-like material which has been longitudinally slit and laterally stressed to form a series of biased oval-like openings therein, said first layer attached to said second layer, a third layer comprising an expanded paper-like material which has been longitudinally slit and laterally stressed to form a series of biased oval-like openings therein, said third layer attached to said second layer, said second and said third layers having opposite orientations, said second and said third layers comprising irregular top and bottom surfaces, said top surface of said second layer enmeshed with said bottom surface of said third layer with said openings of said second and said third layers partially coincidental to allow waste to pass therethrough to said planar base.*

* * * * *